US012683363B2

(12) United States Patent     (10) Patent No.:   US 12,683,363 B2

Ya et al.     (45) Date of Patent:     Jul. 14, 2026

(54) BUSBAR CHAMBER ARC-STRIKING ASSEMBLY AND ELECTRIC CABINET

(71) Applicant: Schneider Electric Industries SAS, Rueil-Malmaison (FR)

(72) Inventors: Ling Ya, Shanghai (CN); Fei Liu, Shanghai (CN); Haifeng Lu, Shanghai (CN); Yinzhong Que, Shanghai (CN); Bhoopender Singh, Lappersdorf (DE); Harethe El Ouadhane, Regensburg (DE)

(73) Assignee: Schneider Electric Industries SAS, Rueil-Malmaison (FR)

( * ) Notice: Subject to any disclaimer, the term of this patent is extended or adjusted under 35 U.S.C. 154(b) by 225 days.

(21) Appl. No.: 18/515,845

(22) Filed: Nov. 21, 2023

(65) Prior Publication Data

US 2024/0186770 A1     Jun. 6, 2024

(30) Foreign Application Priority Data

Dec. 2, 2022   (CN) .......................... 202223228802.7
Mar. 29, 2023   (CN) .......................... 202320661880.1

(51) Int. Cl.
    *H02B 1/20*       (2006.01)
    *H02B 1/30*       (2006.01)
    *H02B 11/26*      (2006.01)

(52) U.S. Cl.
    CPC ................. *H02B 1/20* (2013.01); *H02B 1/30* (2013.01); *H02B 11/26* (2013.01)

(58) Field of Classification Search
    CPC . H02B 1/20; H02B 1/36; H02B 11/26; H02B 13/025; H01H 9/30
    See application file for complete search history.

(56) References Cited

U.S. PATENT DOCUMENTS

| | | | | |
|---|---|---|---|---|
| 5,194,840 A | * | 3/1993 | Frutuoso ................... | H01H 9/48 |
| | | | | 335/132 |
| 10,439,371 B1 | * | 10/2019 | Abroy ....................... | H02B 1/38 |
| 2024/0429689 A1 | * | 12/2024 | Xu ........................ | H02B 13/025 |

FOREIGN PATENT DOCUMENTS

| | | | | |
|---|---|---|---|---|
| EP | 2273634 A1 | * | 1/2011 | ........ H02B 13/0358 |
| EP | 3454436 A1 | | 3/2019 | |
| GB | 2558002 A | * | 7/2018 | ........... H02B 13/065 |
| WO | WO-2006048382 A1 | * | 5/2006 | ........... H02B 11/133 |

OTHER PUBLICATIONS

Siemens Sivacon S8 Low-voltage Switchboard Brochure (Non-patent literature) (pub. Aug. 19) https://assets.new.siemens.com/siemens/assets/api/uuid:318e94ba-b138-4ffb-a696-a5c7b49f10b1/siemenssivacon-s8-2019-08-en.pdf.

* cited by examiner

*Primary Examiner* — Robert J Hoffberg

(74) *Attorney, Agent, or Firm* — Kinney & Lange, P.A.

(57)        ABSTRACT

The present invention discloses a busbar chamber arc-striking assembly, which includes a main frame forming a space configured to accommodate a busbar chamber sleeve, wherein the main frame includes a back plate, and the back plate is arranged on a side of the busbar chamber sleeve opposite to the busbar; and a first arc-striking plate which is parallel to and spaced apart from the back plate of the main frame, wherein the first arc-striking plate is installed to extend between adjacent busbar chamber sleeves. The busbar chamber arc-striking assembly according to the present invention can quickly strike the arc at the initial stage of arc generation, cut off the arc, reduce the arc energy, and ignite the arc itself until the arc is extinguished.

14 Claims, 4 Drawing Sheets

BUSBAR CHAMBER ARC-STRIKING ASSEMBLY AND ELECTRIC CABINET

TECHNICAL FIELD

The present invention relates to a novel busbar chamber arc-striking plate assembly and an electric cabinet including the busbar chamber arc-striking plate assembly.

BACKGROUND

There is a need for arcing resistant for solid busbars. However, in some current solutions of electrical cabinets, the busbar chamber is not separated into a separate compartment, and its space is large. Also, laminated polyester plates are installed at the back side of the low-voltage box and the corresponding side screen to prevent burn-through, but polyester plates are easy to ablate and produce toxic gases, leading to environmental problems. In some other current solutions of electrical cabinets, although an arc-striking plate is used, the structure of the arc-striking plate is simple, and in a case where the space of the busbar chamber is still relatively large, laminated polyester plates are still used at the corresponding side screen to prevent burn-through. Therefore, the performance of the arc-striking plate regarding arc-striking and burn-through resistance is poor, and there are still environmental problems.

Therefore, there is a need to have a busbar chamber as an independent compartment and an arc-striking design that can not only ensure high arcing resistance but also meet high environmental protection requirements.

SUMMARY

In view of the above problems, according to the present invention, a busbar chamber arc-striking assembly is proposed, which includes a main frame forming a space configured to accommodate a busbar chamber sleeve, wherein the main frame includes a back plate, and the back plate is arranged on a side of the busbar chamber sleeve opposite to the busbar; and a first arc-striking plate which is parallel to and spaced apart from the back plate of the main frame, wherein the first arc-striking plate is installed to extend between adjacent busbar chamber sleeves.

The present invention has following advantages: because the first arc-striking plate is close to the busbar chamber sleeves, it is possible to strike arc quickly at the initial stage of arc generation, and to cut off the arc and reduce arc energy.

The busbar chamber arc-striking assembly according to the present invention can have one or more of the following characteristics.

According to one embodiment, in a thickness direction of the first arc-striking plate, the first arc-striking plate is close to the center of the busbar chamber sleeve. This ensures that the first arc-striking plate is close enough to the busbar chamber sleeve in the thickness direction.

According to one embodiment, in the thickness direction of the first arc-striking plate, the distance between the first arc-striking plate and the center of the busbar chamber sleeve is less than or equal to 10 mm.

According to one embodiment, the width of the first arc-striking plate is designed such that when the busbar chamber arc-striking assembly is installed in place, the first arc-striking plate is close to and spaced apart from busbar chamber sleeves on both sides of the first arc-striking plate.

This ensures that the first arc-striking plate is close enough to the busbar chamber sleeves in the width direction.

According to one embodiment, the main frame further includes a top plate and two side plates connected with the back plate. In this way, a busbar chamber as an independent compartment is realized.

According to one embodiment, the busbar chamber arc-striking assembly further includes an internal partition plate, wherein the internal partition plate is arranged in the space formed by the main frame and arranged close to and parallel to the back plate, the width of the internal partition plate spans the distance between the two side plates of the main frame, and the internal partition plate is arranged in the thickness direction between the back plate and the first arcing plate; and an external partition plate, wherein the external partition plate is arranged outside the space formed by the main frame and arranged close to and parallel to the back plate, the width of the external partition plate spans the distance between the two side plates of the main frame. The arrangement of the internal partition plate and the external partition plate is beneficial for arc striking, reduces the arc energy, and can strike the arc and ignite itself until the arc is extinguished without using laminated polyester plates, which is more environmentally friendly and safer.

According to one embodiment, the busbar chamber arc-striking assembly further includes a second arc-striking plate, wherein the second arc-striking plate is arranged between the first arc-striking plate and the internal partition plate and parallel with the back plate, wherein the second arc-striking plate has a width greater than that of the first arc-striking plate. The arrangement of the second arc-striking plate is beneficial for arc striking, reduces the arc energy, and can strike the arc and ignite itself until the arc is extinguished without using laminated polyester plates, which is more environmentally friendly and safer.

According to one embodiment, the busbar chamber arc-striking assembly further includes a side arc-striking plate, wherein the side arc-striking plate is arranged parallel to the internal partition plate and is close to the side plate in the width direction. The arrangement of the side arc-striking plate is beneficial for arc striking near the side plate and reduces the arc energy.

According to one embodiment, the busbar chamber arc-striking assembly further comprises: an intermediate arc-striking plate, and the intermediate arc-striking plate is arranged between the first arc-striking plate and the second arc-striking plate and parallel to the back plate, and is installed to extend between adjacent busbar chamber sleeves. This ensures that the arc can be quickly captured and attracted by the arc-striking plates no matter where it occurs in the initial stage of generation.

According to one embodiment, the busbar chamber arc-striking assembly comprises one to three intermediate arc-striking plates parallel to and spaced apart from each other. The specific quantity can be adjusted according to different parameters of internal arcing tests, so as to adapt to different internal arcing conditions.

According to one embodiment, the first arc-striking plate and the intermediate arc-striking plate are respectively designed such that respective edges of the first arc-striking plate and the intermediate arc-striking plate are at the same distance in respective width directions from the outer contours of adjacent busbar chamber sleeves. This ensures that no matter where the arc occurs in the initial stage of generation, it can be captured and attracted by the arc-striking plates evenly and quickly, and it will ignite itself until the arc is extinguished, so as to prevent the arc from jumping and extending to release more energy.

According to one embodiment, the first arc-striking plate, the second arc-striking plate and the side arc-striking plate are attached to respective reinforcing plates. This can increase the rigidity of the first arc-striking plate, the second arc-striking plate and the side arc-striking plate.

According to one embodiment, the busbar chamber arc-striking assembly further includes a mounting piece, wherein the first arc-striking plate, the second arc-striking plate, the side arc-striking plate, the intermediate arc-striking plate, the internal partition plate and the external partition plate are mounted to the main frame through respective mounting pieces; and spacer rings, wherein the spacer rings are formed in an annular shape and have a fixed thickness, and are configured to be sleeved on respective mounting pieces in different numbers so as to adjust the distance between two components in the busbar chamber arc-striking assembly. The design of the mounting pieces and spacer rings is beneficial to conveniently adjust the distance between the two components in the busbar chamber arc-striking assembly.

According to the present invention, an electric cabinet is also proposed, which includes the above-mentioned busbar chamber arc-striking assembly.

BRIEF DESCRIPTION OF THE DRAWINGS

In order to explain the technical solutions of the embodiments of the present invention more clearly, the attached drawings of the embodiments of the present invention will be briefly introduced below. The attached drawings are only used to show some embodiments of the present invention, and are not used to limit all embodiments of the present invention thereto.

Figure 1:
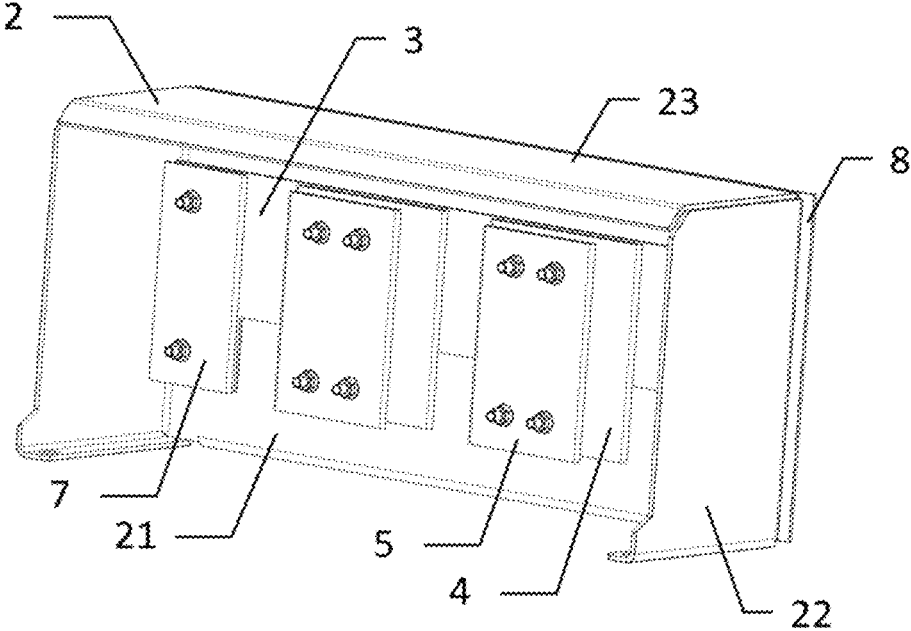
FIG. 1 is a perspective view of a busbar chamber arc-striking assembly according to an embodiment of the present invention.

LIST OF REFERENCE NUMERALS 1 spacer ring
2 main frame
21 back plate
22 side plate
23 top plate
3 internal partition plate
4 second arc-striking plate
5 first arc-striking plate
6 reinforcing plate
7 side arc-striking plate
8 external partition plate 9 busbar chamber sleeve
10 intermediate arc-striking plate
W width direction
T thickness direction

DETAILED DESCRIPTION OF THE EMBODIMENTS

In order to make the purpose, technical solution and advantages of the technical solutions of the present invention clearer, the technical solutions of the embodiments of the present invention will be clearly and completely described below with reference to the drawings of specific embodiments of the present invention. In the drawings, the same reference numerals represent the same parts. It should be noted that the described embodiments are part of the embodiments of the present invention, but not all of them. Based on the described embodiments of the present invention, all other embodiments obtained by those of skills in the art without creative labor are within the protection scope of the present invention.

Unless otherwise defined, the technical terms or scientific terms used here shall have their ordinary meanings as understood by those with ordinary skills in the field to which this invention belongs. The words "first", "second" and the like used in the description and claims of the patent application of the present invention do not indicate any order, quantity or importance, but are only used to distinguish different components. Words "comprising" or "including" and the like mean that the elements or objects appearing before the word cover the listed elements or objects appearing after the word and their equivalents, without excluding other elements or objects. Phrases like "connected to" or "connected with" are not limited to physical or mechanical connections, but can include electrical connections, whether direct or indirect. "Up", "down", "left" and "right" are only used to express relative positional relationship. When the absolute position of the described object changes, the relative positional relationship may also change accordingly.

The present invention will be described in detail below by describing example embodiments.

Figure 2:
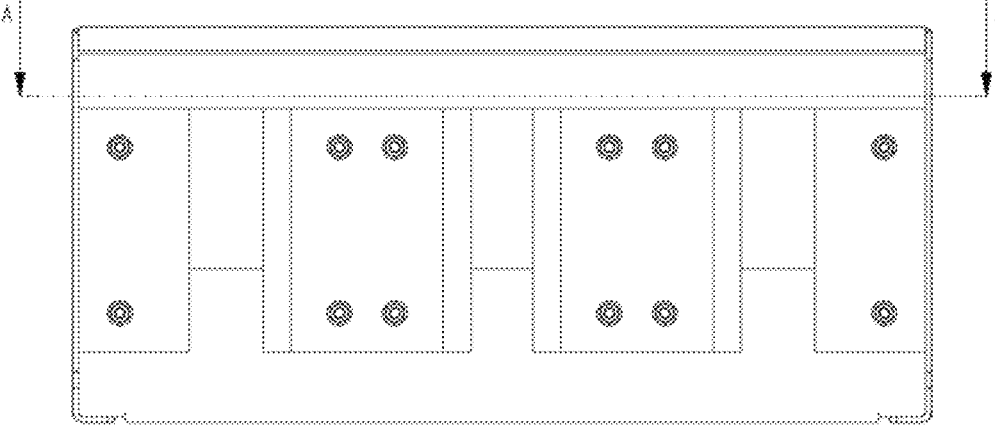
FIG. 2 is a front view of the busbar chamber arc-striking assembly according to an embodiment of the present invention.
Figure 3:
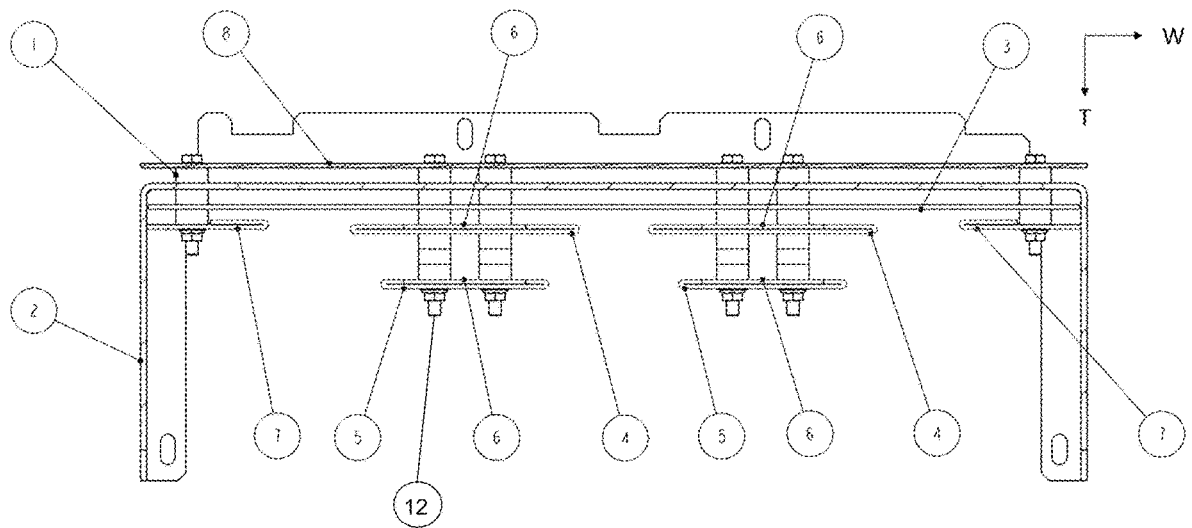
FIG. 3 is a sectional view taken along line A-A of FIG. 2.

With reference to FIGS. 1-3, a busbar chamber arc-striking assembly according to an embodiment of the present invention is described.

Figure 4:
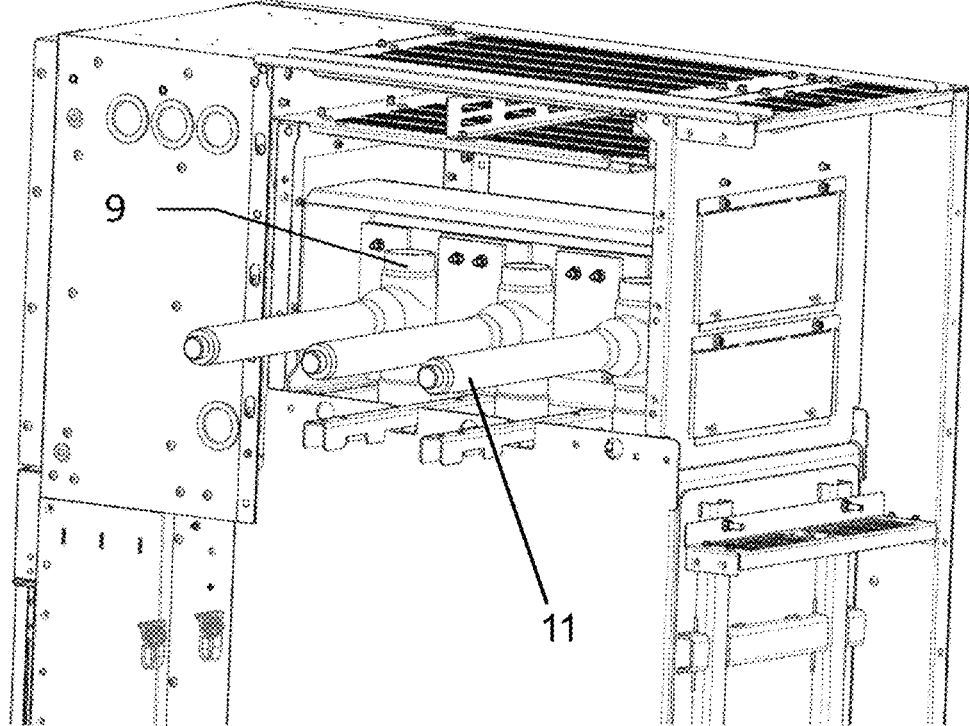
FIG. 4 is a perspective view of an electric cabinet according to an embodiment of the present invention, showing the installation relationship between the busbar chamber arc-striking assembly and the busbar chamber sleeve.
Figure 5:
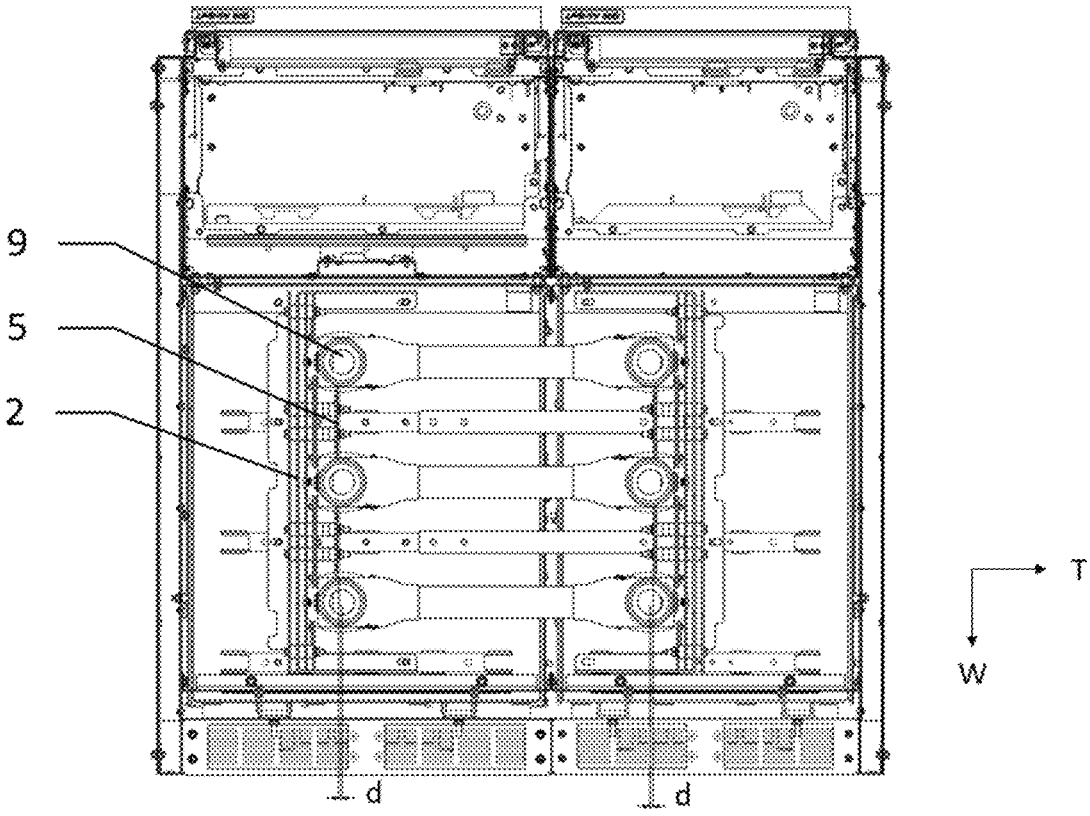
FIG. 5 is a sectional view of an electric cabinet according to an embodiment of the present invention, showing the installation relationship between the busbar chamber arc-striking assembly and the busbar chamber sleeve.

As shown in FIG. 1, the busbar chamber arc-striking assembly includes a main frame 2, which is made of steel, for example. The main frame 2 includes, for example, a back plate 21, a top plate 23, and two side plates 22 that are connected to each other, thereby forming a space for accommodating a busbar chamber sleeve 9. The back plate 21 is arranged on a side of the busbar chamber sleeve 9 opposite to the busbar 11 (shown in FIG. 4). As shown in FIGS. 4 and 5, when the electrical cabinet is assembled, the main frame 2 according to the present invention and an original bottom plate of the electrical cabinet together form a busbar chamber as an independent compartment.

Referring to FIG. 3, the busbar chamber arc-striking assembly may include an internal partition plate 3 and an external partition plate 8. The internal partition plate 3 is arranged in the space formed by the main frame 2 and is arranged close to and parallel to the back plate 21 of the main frame 2. The width of the internal partition plate 3 spans the distance between the two side plates 22 of the main frame 2, for example, it is slightly smaller than the distance between the two side plates 22. The external partition plate 8 is arranged outside the space formed by the main frame 2 and is arranged close to and parallel to the back plate 21 of the main frame 2. The width of the external partition plate 8 spans the distance between the two side plates 22 of the main frame 2, for example, it is slightly larger than the distance between the two side plates 22, and is approximately equal to the distance between the outward-facing surfaces of the two side plates 22.

With continued reference to FIG. 3, the busbar chamber arc-striking assembly may include a first arc-striking plate 5 and a second arc-striking plate 4 both parallel to the back plate 21 of the main frame 2. The widths of the first arc-striking plate 5 and the second arc-striking plate 4 are smaller than the distance between the two side plates 22. The first arc-striking plate 5 and the second arc-striking plate 4 may be provided in a plurality, the number of which depends on the number of busbar chamber sleeves 9. In the example of FIG. 4 and FIG. 5, there are three busbar chamber sleeves 9, and there are two first arc-striking plates 5 and two second arc-striking plates 4 respectively. Compared with the second arc-striking plate 4, the first arc-striking plate 5 is farther away from the back plate 21, that is, the second arc-striking plate 4 is arranged between the first arc-striking plate 5 and the back plate 21, and more specifically, the second arc-striking plate 4 is arranged between the first arc-striking plate 5 and the internal partition plate 3. As shown in FIGS. 4 and 5, the first arc-striking plate 5 is installed to extend between adjacent busbar chamber sleeves 9. Preferably, in the thickness direction T of the first arc-striking plate 5, the first arc-striking plate 5 is close to the center of the busbar chamber sleeve 9, wherein the center of the busbar chamber sleeve 9 is the tube center of the busbar chamber sleeve 9. Specifically, in the thickness direction T of the first arc-striking plate 5, the distance d between the first arc-striking plate 5 and the center of the busbar chamber sleeve 9 may be 2-10 mm, preferably 5 mm. In the width direction W, by the width design and the installation of the first arc-striking plate 5, when the busbar chamber arc-striking assembly is installed in place, the first arc-striking plate 5 is close to and spaced apart from the busbar chamber sleeve 9 at the two sides of the first arc-striking plate 5, as shown in FIG. 5. The width of the second arc-striking plate 4 may be larger than that of the first arc-striking plate 5. The second arc-striking plate 4 may or may not extend between adjacent busbar chamber sleeves 9.

Figure 6:
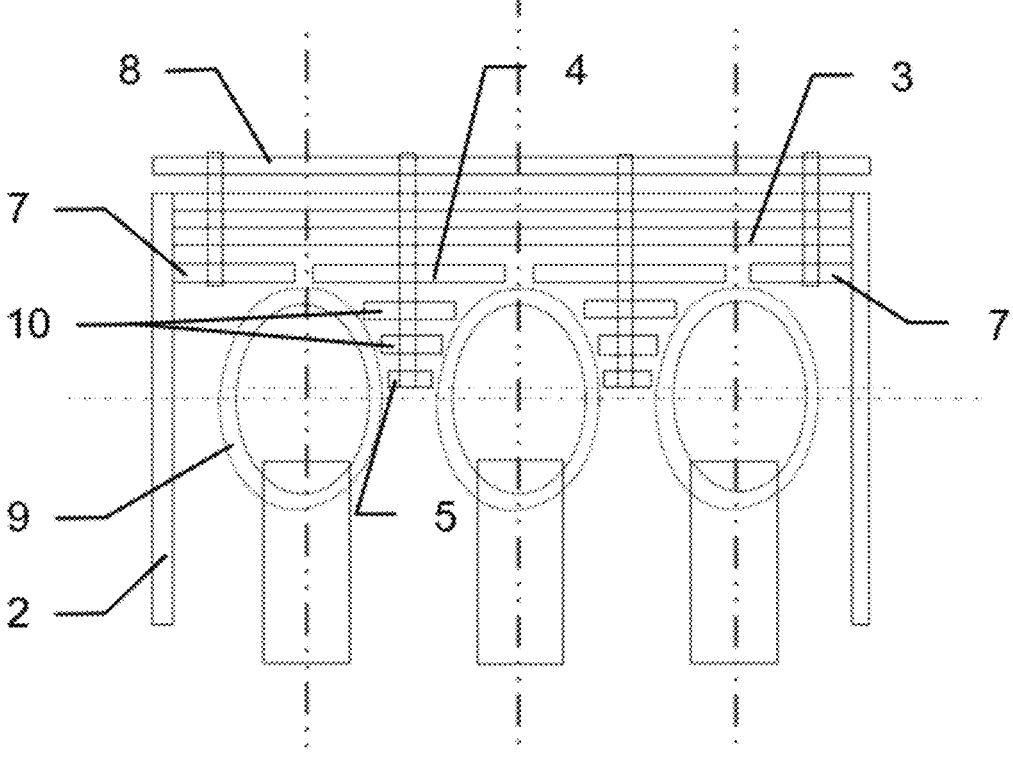
FIG. 6 is a sectional view of the busbar chamber arc-striking assembly according to another embodiment of the present invention.

Referring to FIG. 6, optionally, the busbar chamber arc-striking assembly may further include an intermediate arc-striking plate 10, which is also installed to extend between adjacent busbar chamber sleeves 9, and is arranged between the first arc-striking plate 5 and the second arc-striking plate 4 and parallel with the back plate. In addition, the number of the intermediate arc-striking plates 10 can be 0-3, and the specific quantity can be adjusted according to different parameters of the internal arcing tests. In the embodiment of FIG. 6, the number of the intermediate arc-striking plates 10 is two. The respective width of each intermediate arc-striking plate 10 and the first arc-striking plate (that is, all the arc-striking plates extending between adjacent busbar chamber sleeves 9) is determined according to the distance from the outer contours of the busbar chamber sleeves 9. The design principle is that the respective edges of each intermediate arc-striking plate 10 and the first arc-striking plate 5 are at the same distance in respective width directions from the outer contours of the adjacent bus chamber sleeves 9, so as to ensure that no matter where the arc occurs in the initial stage of generation, the arc can be quickly captured and attracted by the arc-striking plates, burn ignite until the arc is extinguished, so as to prevent the arc from jumping and extending to release more energy.

With continued reference to FIG. 3, the busbar chamber arc-striking assembly may further include a side arc-striking plate 7, which may be arranged parallel to the internal partition plate 3, for example, in the same plane as the second arc-striking plate 4. The side arc-striking plate 7 is close to the side plate 22 in the width direction W. As shown in FIG. 3, the side arc-striking plate 7 is arranged in immediate vicinity of the side plate 22.

In order to increase the rigidity of the arc-striking plates, the first arc-striking plate 5, the second arc-striking plate 4 and the side arc-striking plate 7 can be attached to respective reinforcing plates 6.

Since the first arc-striking plate 5 is close to the busbar chamber sleeve 9 in both the thickness direction T and the width direction W, the arc can be struck quickly at the initial stage of arc generation. With the optional second arc-striking plate 4, side arc-striking plate 7, internal partition plate 3, external partition plate 8, etc., the arc can be quickly cut off at the initial stage of arc generation, the arc energy can be reduced, and ignite themselves until the arc is extinguished. In addition, due to the structural design, there is no need to use laminated polyester plates, which is more environmentally friendly and safer.

It should be noted that the embodiment including all the second arc-striking plate 4, the side arc-striking plate 7, the internal partition plate 3 and the external partition plate 8 is preferred, but each of the second arc-striking plate 4, the side arc-striking plate 7, the internal partition plate 3 and the external partition plate 8 is not necessary.

The following describes the installation of the busbar chamber arc-striking assembly. As shown in FIG. 3, the first arc-striking plate 5, the second arc-striking plate 4, the side arc-striking plate 7, the intermediate arc-striking plate 10, the internal partition plate 3 and the external partition plate 8 can be mounted to the main frame 2 through mounting pieces 12. The mounting piece 12 is, for example, a rod, and the first arc-striking plate 5, the second arc-striking plate 4, the side arc-striking plate 7, the intermediate arc-striking plate 10, the internal partition plate 3 and the external partition plate 8 are arranged on the mounting piece 12 through openings. As shown in FIG. 1, the first arc-striking plate 5 and the second arc-striking plate 4 are respectively provided with four through holes, and the side arc-striking plate 7 is provided with two through holes. In order to facilitate adjustment of the distance between the components, spacer rings 1 can be used. The spacer rings 1 are formed in an annular shape and have a fixed thickness, and are configured to be sleeved on the mounting pieces 12 in different numbers between different components, thereby adjusting the distance between two components in the busbar chamber arc-striking assembly.

In the process of installing busbar chamber arc-striking assemblies according to the present invention to an electrical cabinet, it is only necessary to install a busbar chamber arc-striking assembly in the leftmost and rightmost side cabinets respectively, adjust the distance from the center of the sleeve and fix it.

The structure design of the busbar chamber arc-striking assembly according to the present invention is ingenious, which can be applied to all types of cabinets with solid busbar expansion, especially in the case of narrow busbar chamber space, large phase spacing and high requirements for arc resistance, and which has the advantages of ingenious structure design, reliable performance, environmental protection and the like.

Exemplary implementations of the busbar chamber arc-striking assembly proposed by the present invention are described in detail above with reference to the preferred embodiments. However, those skilled in the art can understand that, without departing from the concept of the present invention, various changes and modifications on the above-mentioned specific embodiments can be made, and various technical features and structures proposed in the present invention can be combined in various ways without exceeding the protection scope of the present invention.

What is claimed is:

1. An electric cabinet comprising:
a plurality of busbars;
a plurality of busbar chamber sleeves, wherein each busbar chamber sleeve of the plurality of busbar chamber sleeves is connected to a corresponding bus bar of the plurality of busbars; and
a busbar chamber arc-striking assembly, wherein the busbar chamber arc-striking assembly comprises:
a main frame forming a space configured to accommodate the plurality of busbar chamber sleeves, wherein the main frame comprises a back plate, and the back plate is arranged on a side of each busbar chamber sleeve of the plurality of busbar chamber sleeves opposite to the corresponding busbar of the plurality of busbars; and
a first arc-striking plate parallel to and spaced apart from the back plate of the main frame, wherein the first arc-striking plate is installed to extend between adjacent busbar chamber sleeves of the plurality of busbar chamber sleeves.

2. The electric cabinet according to claim 1, wherein the first arc-striking plate is close to a center of the busbar chamber sleeve of the plurality of busbar chamber sleeves in a thickness direction of the first arc-striking plate.

3. The electric cabinet according to claim 2, wherein in the thickness direction of the first arc-striking plate, a distance between the first arc-striking plate and the center of each busbar chamber sleeve of the plurality of busbar chamber sleeves is less than or equal to 10 mm.

4. The electric cabinet according to claim 1, wherein a width of the first arc-striking plate is designed such that when the busbar chamber arc-striking assembly is installed in place, the first arc-striking plate is close to and spaced apart from the adjacent busbar chamber sleeves on both sides of the first arc-striking plate.

5. The electric cabinet according to claim 1, wherein the main frame further comprises a top plate and two side plates, the top plate and each of the two side plates are connected with the back plate.

6. The electric cabinet according to claim 5, wherein the busbar chamber arc-striking assembly further comprises:
an internal partition plate, wherein the internal partition plate is arranged in a space formed by the main frame and arranged close to and parallel to the back plate, a width of the internal partition plate spans a distance between the two side plates of the main frame, and the internal partition plate is arranged in a thickness direction between the back plate and the first arc-striking plate; and
an external partition plate, wherein the external partition plate is arranged outside the space formed by the main frame and arranged close to and parallel to the back plate, a width of the external partition plate spans the distance between the two side plates of the main frame.

7. The electric cabinet according to claim 6, wherein the busbar chamber arc-striking assembly further comprises:
a second arc-striking plate, wherein the second arc-striking plate is arranged between the first arc-striking plate and the internal partition plate and parallel with the back plate, wherein the second arc-striking plate has a width greater than a width of the first arc-striking plate.

8. The electric cabinet according to claim 7, wherein the busbar chamber arc-striking assembly further comprises:
a side arc-striking plate, wherein the side arc-striking plate is arranged parallel to the internal partition plate and is close to one of the two side plates in a width direction.

9. The electric cabinet according to claim 8, wherein the busbar chamber arc-striking assembly further comprises:
an intermediate arc-striking plate, wherein the intermediate arc-striking plate is arranged between the first arc-striking plate and the second arc-striking plate and parallel to the back plate, and is installed to extend between the adjacent busbar chamber sleeves of the plurality of busbar chamber sleeves.

10. The electric cabinet according to claim 9, wherein the intermediate arc-striking plate comprises two to three of the intermediate arc-striking plate parallel to and spaced apart from each other.

11. The electric cabinet according to claim 10, wherein the first arc-striking plate and the two to three of the intermediate arc-striking plate are respectively designed such that respective edges of each of the first arc-striking plate and the two to three of the intermediate arc-striking plate are at a same distance in respective width directions from outer contours of the adjacent busbar chamber sleeves of the plurality of busbar chamber sleeves.

12. The electric cabinet according to claim 11, wherein the first arc-striking plate, the second arc-striking plate, the side arc-striking plate and each of the two to three of the intermediate arc-striking plate are attached to a respective reinforcing plate.

13. The electric cabinet according to claim 11, wherein the busbar chamber arc-striking assembly further comprises a plurality of mounting pieces, wherein the first arc-striking plate, the second arc-striking plate, the side arc-striking plate, each of the two to three of the intermediate arc-striking plate, the internal partition plate and the external partition plate are mounted to the main frame through a respective mounting piece of the plurality of mounting pieces.

14. The electric cabinet according to claim 13, wherein the busbar chamber arc-striking assembly further comprises a plurality of spacer rings, wherein each of the spacer rings are formed in an annular shape and have a fixed thickness, and are configured to be sleeved on the respective mounting piece of the plurality of mounting pieces in different numbers so as to adjust a distance between two components in the busbar chamber arc-striking assembly, wherein each of the two components is selected from a group consisting of the first arc-striking plate, one of the two to three of the intermediate arc-striking plate, the second arc-striking plate, the side arc-striking plate, the internal partition plate, the back plate of the main frame, and the external partition plate.

* * * * *